US008485247B2

(12) United States Patent
Lavric

(10) Patent No.: US 8,485,247 B2
(45) Date of Patent: Jul. 16, 2013

(54) HEAT EXCHANGERS FOR MICROSTRUCTURES

(75) Inventor: Elena Daniela Lavric, Avon (FR)

(73) Assignee: Corning Incorporated, Corning, NY (US)

( * ) Notice: Subject to any disclaimer, the term of this patent is extended or adjusted under 35 U.S.C. 154(b) by 675 days.

(21) Appl. No.: 12/623,701

(22) Filed: Nov. 23, 2009

(65) Prior Publication Data
US 2010/0126699 A1 May 27, 2010

(30) Foreign Application Priority Data

Nov. 26, 2008 (EP) .................................. 08305844

(51) Int. Cl.
*F28F 3/04* (2006.01)
(52) U.S. Cl.
USPC ............................ 165/166; 165/167; 165/181
(58) Field of Classification Search
USPC ................. 165/140, 166, 167, 174, 179, 181
See application file for complete search history.

(56) References Cited

U.S. PATENT DOCUMENTS

| 3,154,141 | A | * | 10/1964 | Huet .............................. 165/133 |
| 3,532,161 | A | * | 10/1970 | Loebel ........................... 165/167 |
| 4,616,695 | A | * | 10/1986 | Takahashi et al. .............. 165/54 |
| 5,303,770 | A | * | 4/1994 | Dierbeck ....................... 165/140 |
| 6,180,846 | B1 | | 1/2001 | Dandekar et al. .............. 585/443 |
| 7,007,709 | B2 | | 3/2006 | Guzman et al. ................. 137/13 |
| 7,334,631 | B2 | | 2/2008 | Yasuyoshi et al. ............. 165/166 |
| 2004/0069473 | A1 | * | 4/2004 | Blomgren et al. ............. 165/167 |
| 2006/0073080 | A1 | * | 4/2006 | Tonkovich et al. ........... 422/100 |
| 2006/0090887 | A1 | * | 5/2006 | Kato et al. ..................... 165/166 |
| 2007/0001763 | A1 | | 1/2007 | Ju .................................. 330/259 |
| 2007/0154666 | A1 | | 7/2007 | Coonan et al. ............... 428/34.4 |

FOREIGN PATENT DOCUMENTS

| EP | 1542010 | 6/2005 |
| EP | 1679115 | 7/2006 |
| EP | 1820571 | 8/2007 |
| EP | 1854536 | 11/2007 |
| EP | 1854536 A1 | 11/2007 |
| EP | 1964817 | 8/2010 |

OTHER PUBLICATIONS

Metwally, "Enhanced heat transfer due to curature-induced lateral vortices in laminar flows in sinusoidal corrugated-plate channels," Int'l J. of Heat and Mass Transfer 47 (2004) 2283-2292.
Jiang, et al "Helical flows and Chaotic Mixing in Curved Micro Channels," AIChE Journal Sep. 2004, vol. 50, No. 9.
Manglik, "Low Reynolds number forced convection in three-dimensional wavy-plate-fin compact channels: fin density effects," Int'l J. of Heat and Transfer 48 (2005) 1439-1449.

(Continued)

*Primary Examiner* — Teresa Walberg
(74) *Attorney, Agent, or Firm* — Gregory V. Bean

(57) ABSTRACT

A multiple-layered microfluidic device includes at least a first fluid path and at least a second fluid path, wherein the first fluid path includes a layer or portion of a layer of the microfluidic device. The first path has multiple rows of serpentine wall segments positioned there along. The wall segments extend in a direction along the first path. The rows extend along a direction cross-ways to the first path. Adjacent ones of wall segments within a row are arranged such that concave portions face concave portions of adjacent ones of segments, while convex portions face convex portions of adjacent ones of segments.

10 Claims, 5 Drawing Sheets

OTHER PUBLICATIONS

Zhang, "Effect of fin waviness and spacing on the lateral vortex structure and laminar heat transfer in wavy-plate-fin cores," Int'l J. of Heat and Tanfer 47 (2004) 1719-1730.

Naphon, "Heat transfer and pressure drop in the horizontal double pipes with and without twisted tape insert," Int'l Comm. In Heat and Mass Transfer 33 (2006) 166-175.

Chang, "Turbulent heat transfer and pressure drop in tube fitted with serrated twisted tape," Intl J. of Thermal Sciences (2006) doi:10:1016.

Sivashanmugam, "Experimental studies on heat transfer and friction factor characteristics of turbulent flow through a circular tube fitted with helical screw-tape inserts," Chemical Eng. and Processing 2006.

Eiamsa-art, "Experimental investigation of heat tgransfer and flow friction in a circular tube fitted with regularly spaced twisted tape elements," Int'l Comm. in Heat and Mass Transfer 33 (2006) 1225-1233.

Ko, "Thermodynamic analysis of optimal mass flow rate for fully developed laminar forced convection in a helical coiled tube based on minimal entropy generation principle," Energy Conversion and Management 47 (2006) 3094-3104.

Rosaguti, "Low-Reynolds number heat transfer enhancement in sinusoidal channels," Chemical Engineering Science 72 (2007) 694-702.

Yang, "On the heat transfer characteristics of heat sinks: Influence of fin spacing at low Reynolds number region," Int'l J. of Heat and Mass Transfer 50 (2007) 2667-2674.

Naphon, "Effect of curvature ratios on the heat transfer and flow developments in the horizontal spirally coiled tubes," Int'l J. of Heat and Mass Transfer 90 (2007) 444-451.

Naphon, "A review of flow and heat transfer characteristics in curved tubes," Renewable and Sustainable Energy Reviews 10 (2006) 463-490.

Ferrouillat, "Open loop thermal control of exothermal chemical reactions in multifunctional heat exchanger," Int'l J. of Heat and Mass Transfer 49 (2006) 2479-2490.

Ferrouillat, "Micromixing enhancement by turbulence: Application to multifunctional heat exchanger," Chemical Engineering and Processing 45 (2006) 633-640.

Seo, "Membraneless microseparation by asymmetry in curvilinear laminar flows," J. of Chromatography A 1162 (2007) 126-131.

Kuo, "Numerical modelling of non-adiabatic heat-recirculating combustors," Proc. of the Combusion Inst. 31 (2007) 3277-3284.

Ahn, "Gas-phase and catalytic combustion in heat-recirculating burners," Proc. of the Combusion Institute 30 (2005) 2463-2472.

Ferrouillat, "Intensification of heat-transfer and mixing in multifunctional heat exchangers by artificially generated streamwise vorticity," Applied Thermal Engineering 26 (2006) 1820-1829.

Rosaguti, "Laminar flow and heat transfer in a period serpentine channel with semi-circular cross section," Int'l J. of Heat and Mass Transfer 49 (2006) 2912-2923.

Lawson, "Heat transfer augmentation along the tube wall of a louvered fin heat exchanger using practical delta winglets," Int'l J. of Heat and Mass Transfer 51 (2008) 2346-2360.

Gentry, "RODbaffle Heat Exchanger Technology" Chemical Engineering Progress Jul. 1990, p. 48.

Qiao, "Waste polyvinylchloride derived pitch as a precursor to develop carbon fibers and activated carbon fibers."

Metwally, "Enhanced Heat Transfer Due to Curature-Induced Lateral Vortices in Laminar Flows in Sinusoidal Corrugated-Plated Channels"; International Journal of Heat and Mass Transfer 47 (2004) 2283-2292.

Ferrouillat et al; "Intensification of Heat-Transfer and Mixing in Multifunctional Heat Exchangers by Artificially Generated Streamwise Vorticity"; Applied Thermal Engineering 26 (2006) 1820-1829.

Yang et al; "On the Heat Transfer Characteristics of Heat Sinks: Influence of Fin Spacing at Low Reynolds Number Region"; International Journal of Heat and Mass Transfer 50 (2007) 2667-2674.

Rosaguti et al; "Laminar Flow and Heat Transfer in a Periodic Serpentine Channel with Semi-Circular Cross-Section"; International Journal of Heat and Mass Transfer 49 (2006) 2912-2923.

Naphon et al; "A Review of Flow and Heat Transfer Characteristics in Curved Tubes"; Renewable and Sustainable Energy Reviews 10 (2006) 463-490.

Jiang et al; "Helical Flows and Chaotic Mixing in Curved Micro Channels"; AIChE Journal 50 (2004) 2297-2305.

Qiao et al; "Waste Polyvinylchloride Derived Pitch as a Precursor to Develop Carbon Fibers and Activated Carbon Fibers"; Waste Management 27 (2007) 1884-1890.

Gentry; "RODbaffle Heat Exchanger Technology"; Chemical Engineering Progress (Jul. 1990) p. 48.

Lawson et al; "Heat Transfer Augmentation Along the Tube Wall of a Louvered Fin Heat Exchanger Using Practical Delta Winglets"; International Journal of Heat and Mass Transfer 51 (2008) 2346-2360.

Ahn et al; "Gas-Phase and Catalytic Combustion in Heat-Recirculating Burners"; Proceedings of the Combustion Institute 30 (2005) 2463-2472.

Kuo et al; "Numerical Modeling of Non-Adiabatic Heat-Recirculating Combustors"; Proceedings of the Combustion Institute 31 (2007) 3277-3284.

Seo et al; "Membraneless Microseparation by Asymmetry in Curvilinear Laminar Flows"; Journal of Chromatography A, 1162 (2007) 126-131.

Ferrouillat et al; "Micromixing Enhancement by Turbulence: Application to Multifunctional Heat Exchangers"; Chemical Engineering Proessing 45 (2006) 633-640.

Ferrouillat et al; "Open Loop Thermal Control of Exothermal Chemical Reactions in Multifunctional Heat Exchangers"; International Journal of Heat and Mass Transfer 49 (2006) 2479-2490.

Naphon et al; "Effect of Curvature Ratios on the Heat Transfer and Flow Developments in the Horizontal Spirally Coiled Tubes"; International Journal of Heat and Mass Transfer 50 (2007) 444-451.

Yang et al; "A Comparative Study of the Airside Performance of Heat Sinks Having Pin Fin Configurations"; International Journal of Heat and Mass Transfer (2007).

Rosaguti et al; "Low-Reynolds Number Heat Transfer Enhancement in Sinusoidal Channels"; Chemical Engineering Science 62 (2007) 694-702.

Ko; "Thermodynamic Analysis of Optimal Mass Flow Rate for Fully Developed Laminar Forced Convection in a Helical Coiled Tube Based on Minimal Entropy Generation Principle"; Energy Conversion and Management 47 (2006) 3094-3104.

Eiamsa-ard et al; "Experimental Investigation of Heat Transfer and Flow Friction in a Circular Tube Fitted with Regularly Spaced Twisted Tape Elements"; International Communications in Heat and Mass Transfer 33 (2006) 1225-1233.

Sivashanmugam et al; "Experimental Studies on Heat Transfer and Friction Factor Characteristics of Turbulent Flow Through a Circular Tube Fitted with Helical Screw-Tape Inserts"; Chemical Engineering Processing (2006).

Chang et al; "Turbulent Heat Transfer and Pressure Drop in Tube Fitted with Serrated Twisted Tape"; International Journal of Thermal Sciences (2006).

Naphon; "Heat Transfer and Pressure Drop in the Horizontal Double Pipes With and Without Twisted Tape Insert"; International Communications in Heat and Mass Transfer 33 (2006) 166-175.

Zhang et al; "Effect of Fin Waviness and Spacing on the Lateral Vortex Structure and Laminar Heat Transfer in Wavy-Plate-Fin Cores"; International Journal of Heat and Mass Transfer 47 (2004) 1719-1730.

Manglik et al; Low Reynolds Number Forced Convection in Three-Dimensional Wavy-Plate-Fin Compact Channels: Fin Density Effects; International Journal of Heat and Mass Transfer 48 (2005) 1439-1449.

* cited by examiner

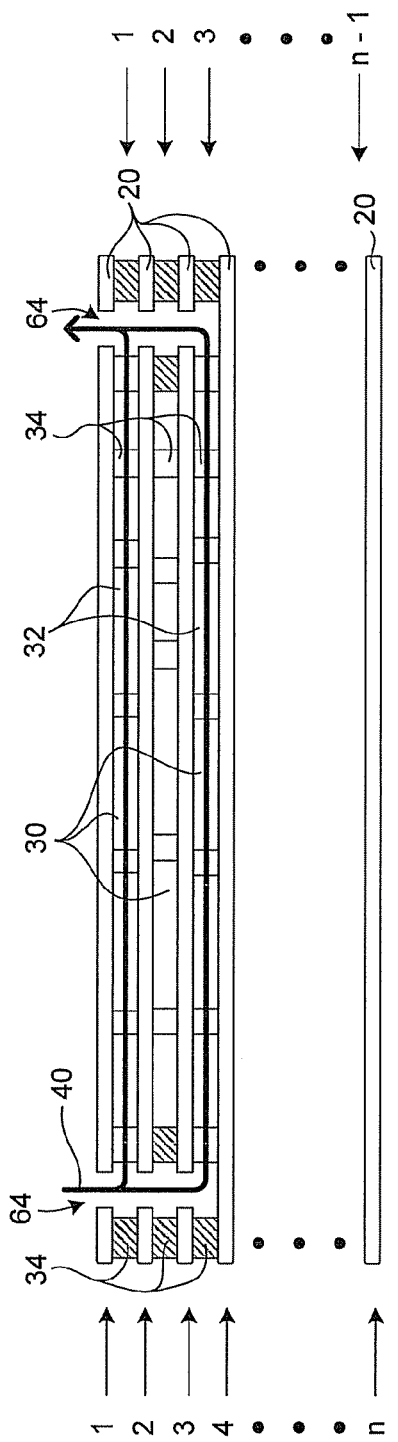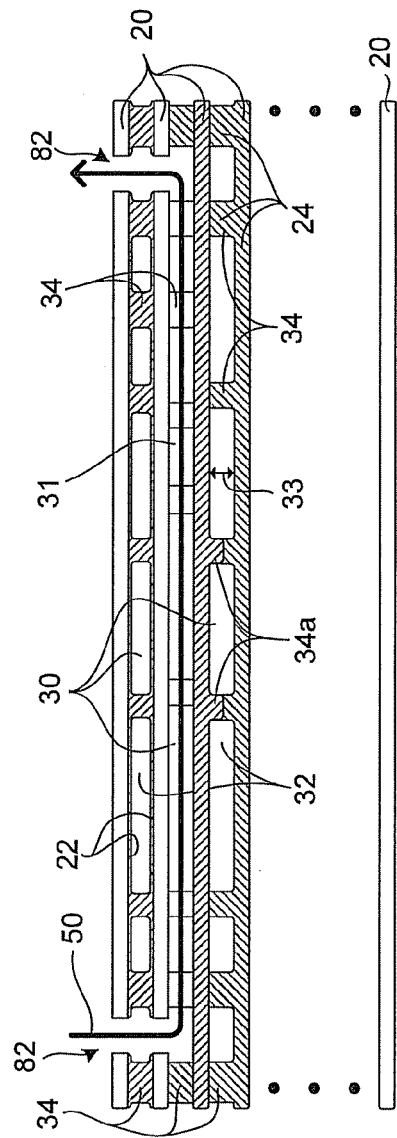

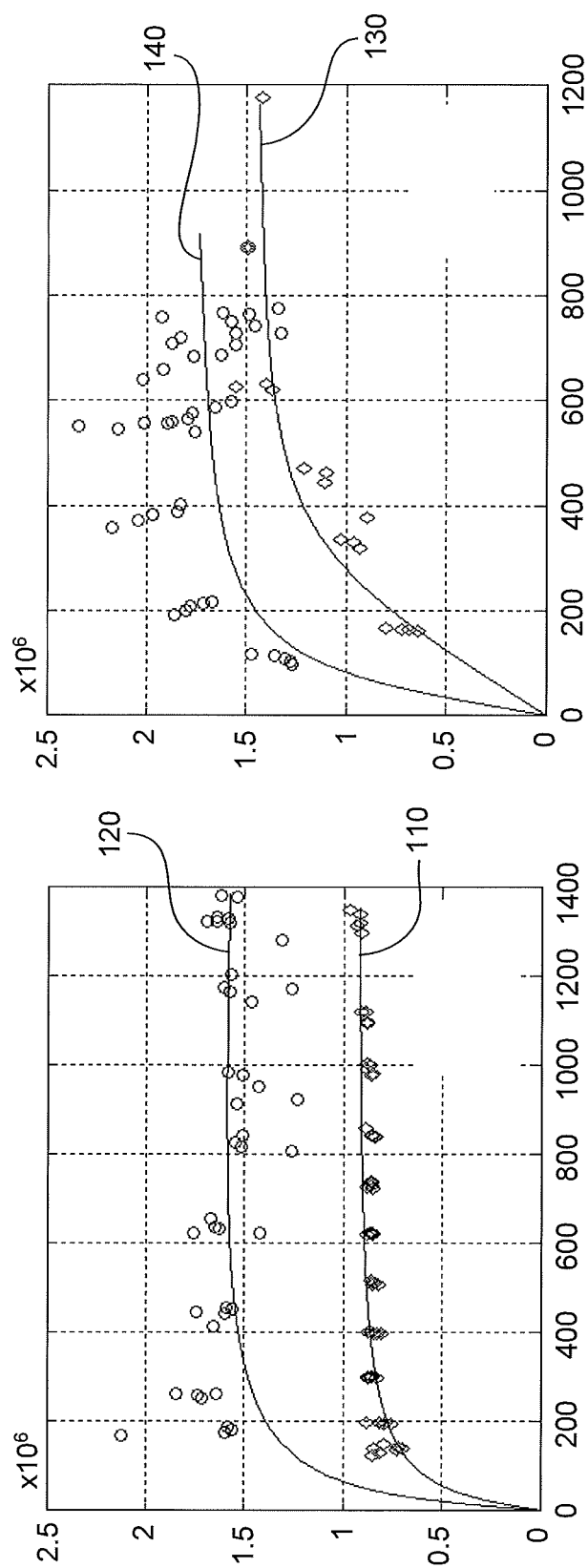

HEAT EXCHANGERS FOR MICROSTRUCTURES

PRIORITY

This application claims priority to European Patent Application number 08305844.6, filed Nov. 26, 2008, titled "Heat Exchangers For Microstructures".

BACKGROUND

This application relates to devices and methods for heat exchangers useful in microfluidic devices.

SUMMARY

According to one aspect of the invention, a multiple-layered microfluidic device comprises at least a first fluid path and at least a second fluid path, wherein the first fluid path comprises a layer or portion of a layer of the microfluidic device. The first path has multiple rows of serpentine wall segments positioned there along. The wall segments extend in a direction along the first path. The rows extend along a direction cross-ways to the first path. Adjacent ones of wall segments within a row are arranged such that concave portions face concave portions of adjacent ones of segments, while convex portions face convex portions of adjacent ones of segments.

Additional variations and features of the present invention are described below in connection with the figures, of which:

BRIEF DESCRIPTION OF THE DRAWINGS

FIG. 1 is cross section of a microstructure in the form of a microfluidic device 10;

FIG. 2 is another cross section of the microstructure or microfluidic device 10 of FIG. 1;

FIGS. 6-8 are graphs comparing the performance of an embodiment of a microstructure having the structure of FIG. 3 to an embodiment of a microstructure having the comparative structure of FIG. 5;

DETAILED DESCRIPTION

Figure 3:
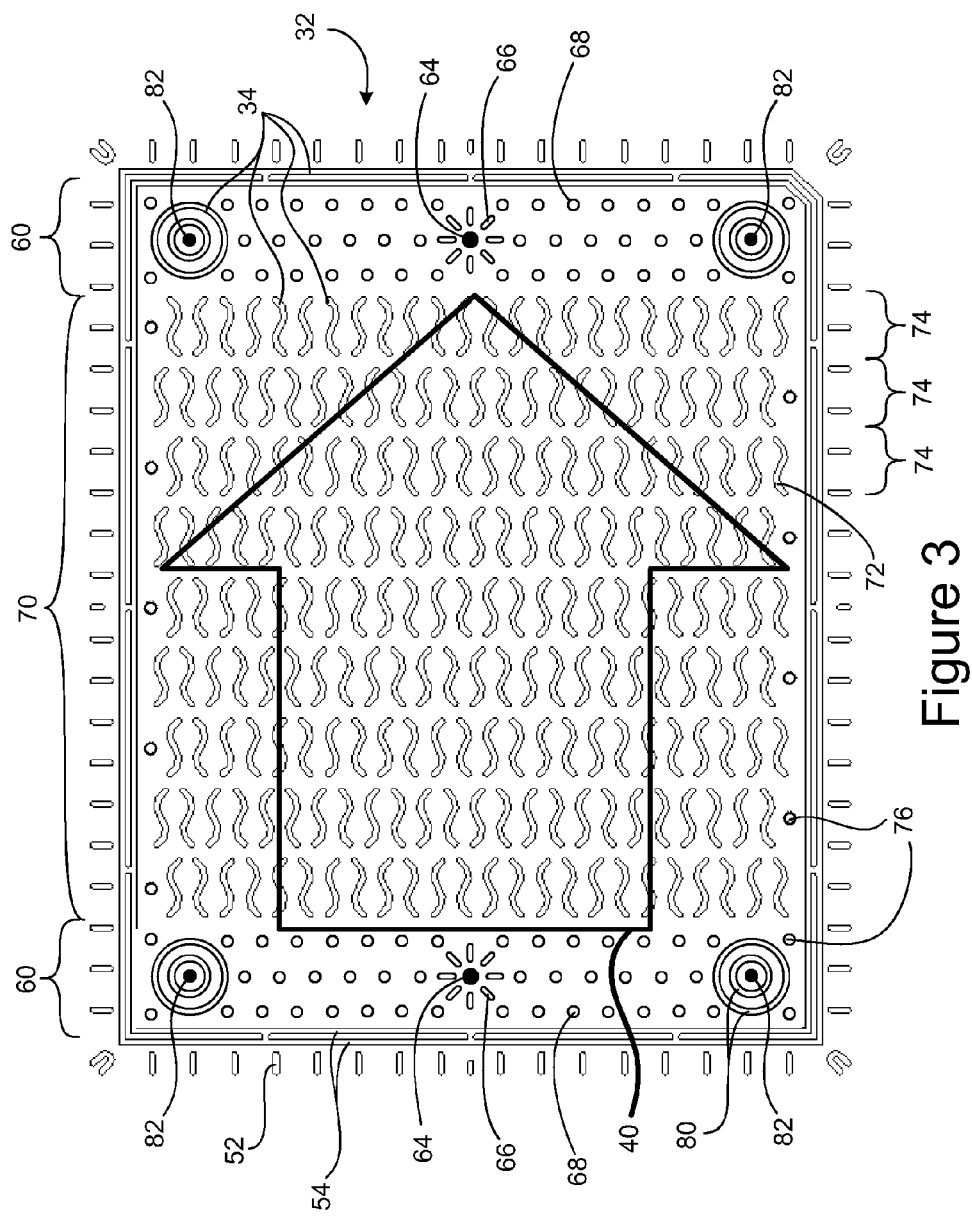
FIG. 3 is a cross-sectional plan view showing an arrangement of walls 34 of a layer 32 of a microstructure such as the microfluidic device 10 of FIGS. 1 and 2.

Whenever possible, the same reference numerals will be used throughout the drawings to refer to the same or like parts. Features described as desirable are preferred but optional, representative of variations of the invention.

Within this document, "microstructure" refers to single-piece or otherwise generally permanently assembled microfluidic devices having internal passages with at least one characteristic cross-sectional dimension in the few-millimeter to sub-millimeter range; "microreactor" refers to a device for performing chemical or physical processes or combinations thereof, the device including one or more microstructures.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carboxylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

FIG. 1 is cross section of a microstructure in the form of a microfluidic device 10. The microfluidic device 10 may be comprised of multiple substrates 20, generally at least four as shown at the top of the figure, but more may be included if desired, up to "n" total, as labeled at the left edge of FIG. 1. Between each adjacent pair of the multiple substrates 20, a layer 30 of the device 10 is defined, such that multiple layers are present, generally at least three, and optionally more, with up to n−1 total layers, as labeled at the right edge of FIG. 1. The substrates 20 are joined to each other and supported relative to one another by walls 34 (for ease of viewing, not all labeled), some of which are cut by the cross section of the figure, as indicated by the cross-hatching. Holes 64, which may extend through one or more of the substrates 20, provide external access to a first fluidic path 40 defined through one or more of the layers 30, in this case through the two layers 32 of the layers 30. Alternative access methods, such as passages through walls 34, may also be used if desired.

In the use of the device, the first fluidic path 40 is desirably used for flowing a thermal control fluid, but may also, in some devices or for performing some operations, be used to flow a process fluid such as a mixture in a reaction process or the like. FIG. 2 is another cross section of the microstructure or microfluidic device 10 of FIG. 1 taken in a different plane parallel to that of FIG. 1. In the cross section of FIG. 2 may be seen holes 82 which provide access to a second fluidic path 50 defined through one or more layers 30 of the device, in this case through the one layer 31. Layer 31, bordered on both major sides thereof by layers 32, is typically but not necessarily used for reaction fluids or other process fluids for which heat exchange is desirable.

Various materials methods may be used to form microfluidic devices 10 of the type shown in FIGS. 1 and 2, including molding or otherwise forming a glass-containing frit to form walls 34 between substrates 20 of glass, ceramic, metal, or other materials, then heating or "firing" the frit walls to adhere the walls 34 and substrates 20 together, forming a microfluidic device. Such processes are disclosed and described, for example, in U.S. Pat. No. 7,007,709, A Microfluidic Device and Manufacture Thereof, assigned to the assignee of the present invention.

The results of some alternate forming methods are represented in the cross section of FIG. 2. In one alternate method, a glass or glass-ceramic sheet or a glass-containing frit composition may be formed by heating together with a mold as disclosed and described for example in EP Application No. 07300835, Method for Making Microfluidic Devices and Devices Produced Thereof, filed 28 Feb. 2007 and assigned to the present assignee, or by injection molding as disclosed and described for example in US Patent Publication No. 2007-0154666, Powder Injection Molding of Glass and Glass-Ceramics, filed 31 Mar. 2006 and assigned to the present assignee. If walls 34 are formed onto a substrate 20 from a frit or from a flat glass precursor, a thin layer 22 of the consolidated frit material or a thin layer 22 of the molded glass material may remain on the substrate surfaces, such that said thin layer 22 lines the respective layer 30 of the device 10, as shown at the top of FIG. 2. As a further alternative, rather than molding onto a substrate, walls 34 and an adjacent substrate may be molded as a single piece, as represented in FIG. 2 by the fourth from the top of the substrates 20 and the associated walls 34, which are all part of one consolidated structure 24, such that a separate substrate, in the sense of a pre-formed generally flat object on which other structures are placed or formed, is not required. Another single piece molded layer may have cooperating walls 34a that meet and seal to walls 34. Any other appropriate forming methods may also be applied to fatal the structures of the present invention.

FIG. 3 is a cross-sectional plan view of a device 10 such as that in FIGS. 1 and 2, showing the structures of walls 34 of a layer 32 including a fluid path 40 extending from one hole or entrance port 64 to another. The cross section is taken through the walls 34, and only walls 34 are shown, with the exception of ports or holes 64, 82.

The layer 32 shown in FIG. 3 includes various types of walls 34. A doubled boundary wall 54 laterally encloses the fluidic path 40 of the layer 32. Short oblong buttress walls 52 surround the boundary wall 54. In the corners of the layer, double circular walls 80 surround holes 82 that provide access to other layers not in the plane of the figure. Short oblong walls 66 in a radiating pattern around each hole 64 give added support to the substrate material in the region of the input and output ports or holes 64. A second fluidic path 50 such as in FIG. 2, in a layer not in the plane of FIG. 3, may be accessed via one or more of the holes 82.

The first fluidic path 40 comprises a layer 32 having multiple rows 74 of serpentine wall segments 72 positioned therein. The wall segments are walls 34 that connect the two substrates 20 bounding the layer 32, as shown in FIG. 1. As shown in FIG. 3, the serpentine wall segments 72 extend in a direction along the direction of the first path 40. As seen in FIG. 3 and in FIG. 4, which is an enlarged partial cross-sectional plan view of the features shown in FIG. 3, the rows 74 of wall segments 72 extend along a direction cross-ways to the first path 40, with adjacent ones of the wall segments 72 within a row 74 arranged such that concave portions 73 face concave portions 73 of adjacent ones of segments 72, while convex portions 75 face convex portions 75 of adjacent ones of segments 72.

Figure 4:
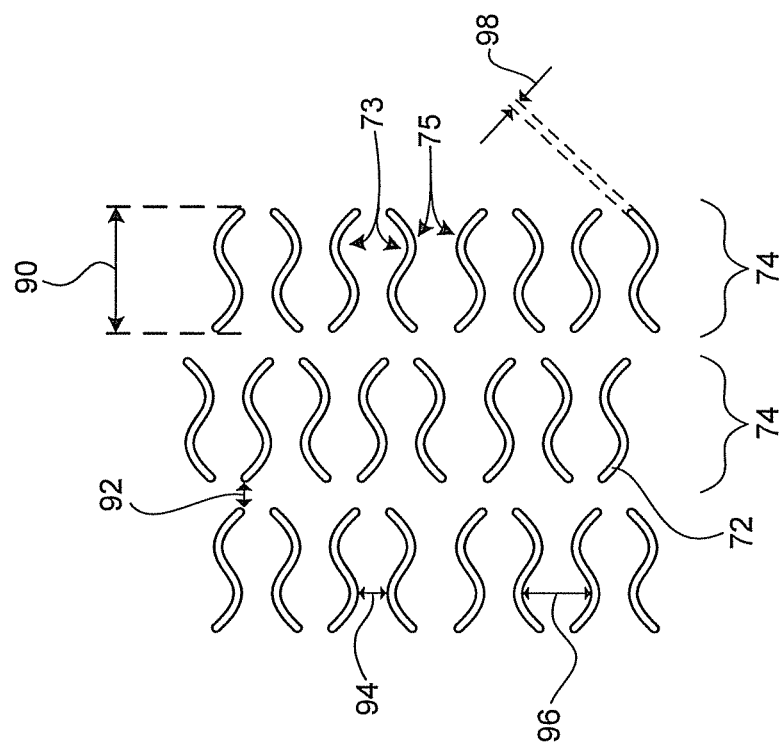
FIG. 4 is an enlarged partial plan view of the features shown in FIG. 3.

As seen in FIGS. 3 and 4, the segments 72 are desirably S-shaped, although longer serpentine forms may also be used. The segments 72 of each row 74 are desirably at offset positions relative to the segments 72 of an adjacent row 74. The amount of offset is desirably equal to one-half of the center-to-center distance within the row 74 from one segment 72 to the next segment 72. Referring to FIG. 4, the distance 96 between facing concave portions 73 of adjacent ones of the segments 72 is desirably at least twice the distance 94 between facing convex portions 75 of adjacent ones of segments 72 within a row 74.

As shown in FIG. 3, layer 32 desirably includes a relatively more open region 60 adjacent to the first row of the rows 74, and adjacent to the last row of the rows 74. The openness may be achieved, while still providing adequate pressure resistance for the enclosed layer 32, by using walls 34 that take the form of small round pillars 68 in the more open region 60. Pillars 68 provide structural strength without providing as much flow resistance as in the region 70 comprised of the rows 74 of serpentine wall segments 72. Thus regions 60 can act as low-flow-resistance manifolds and collectors for the region 70 of rows 40 of segments 72.

The staggered rows 74 of serpentine wall segments 72 of the present invention act to minimize the thickness of boundary layers by producing Dean vortices and/or other secondary flows in a fluid flowing along the first path 40. The secondary flows thus generated significantly improve heat exchange performance of the microfluidic device 10 with only modest increase in pressure drop relative to comparative designs. It is also desirable to minimize the boundary layer by limiting the height 33 (see FIG. 2) of the layer(s) 32 in which the fluid path 40 is contained. The height 33 of the layer 32 in which the path 40 is contained desirably in the range of 0.2 to 3 millimeters, more desirably in the range of 0.2 to 1.5 millimeters, most desirably in the range of 0.2 to 0.75 millimeters. The thickness 98 of the segments 72 is desirably in the range of 0.5 to 1.5 millimeters (see FIG. 4). The distance 94 between facing convex portions 75 of adjacent ones of segments 72 is desirably in the range of 2-4 millimeters, and the distance 96 between facing concave portions 73 of adjacent ones of segments 72 is desirably in the range of 4-8 millimeters, and is desirably at least twice the distanced 94. The distance 92 between adjacent rows 74 is desirably in the range of 1-3 millimeters.

Figure 5:
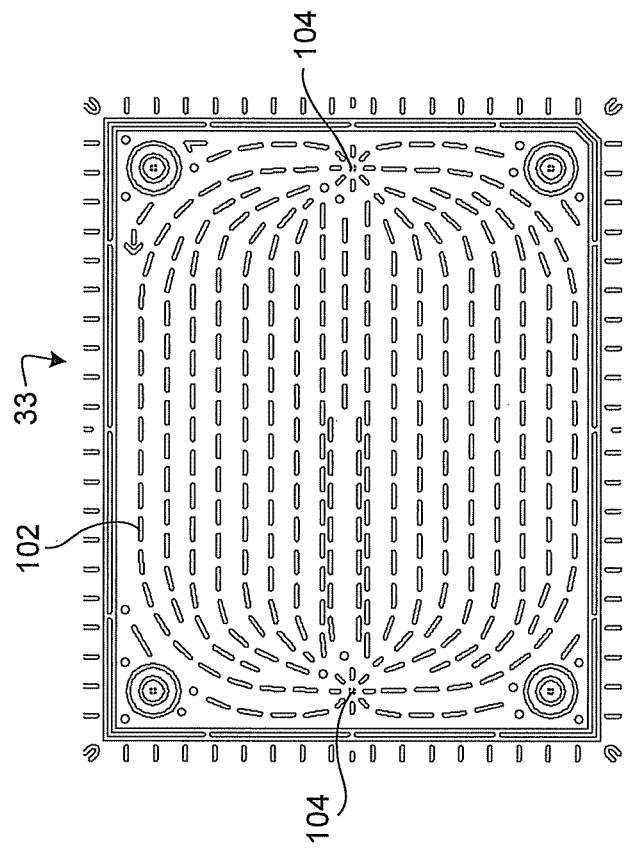
FIG. 5 is a plan view showing features of a comparative thermal control layer 33.

A previous design of a device 10 having a layer 33 as shown in FIG. 5 was tested for comparative purposes. In the device of FIG. 5, in the layer 33 of FIG. 5, segmented walls 102 are not serpentine and are not arranged in staggered or offset rows, but are arranged instead to guide a fluid relatively smoothly from one access hole or port 104 to the other.

EXPERIMENTAL

Comparative tests were performed for a device 10 having a layer 32 as shown in FIG. 3 and for a comparative device 10 having a layer 33 as shown in FIG. 5. The second fluid path, path 50 of FIG. 2, was structured essentially identically in both devices, and the heat exchanged between a fluid in the respective layer 32 or 33 and a fluid in the second fluid path. The results are reflected in the Table below.

The table shows the relative characteristics and performance of a device 10 of the present invention having one or more layers 32 as shown in FIGS. 3 and 4, relative to a comparative device similar to the inventive device but having one or more layers 33 as shown in FIG. 5, for three different fluids flowed in the respective layers 32, 33. As may be seen from the table, for only an 18% relative increase in pressure drop (measured for water at 1 liter/minute), a heat transfer increase of up to 40% was realized.

Figure 8:
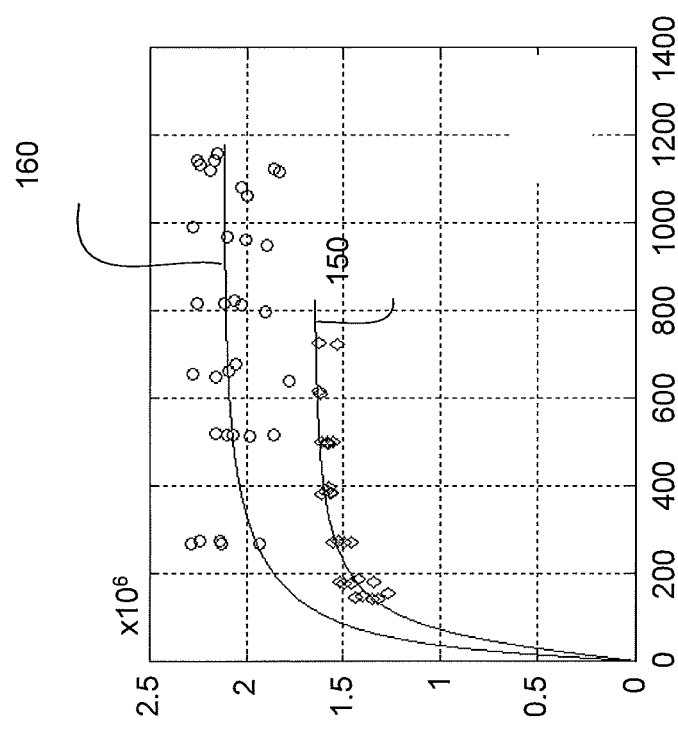

More detailed test results are shown in the graphs of FIGS. 6-8, each of which shows the achieved volumetric heat transfer coefficient in $W/m^3K$, as a function of flow rate of fluid in the first path 40 in milliliters per minute. FIG. 6 shows results for ethanol as the fluid in path 40, with trace 120 indicating the performance of the inventive device including the structure of FIG. 3, while trace 110 indicates the performance of the comparative device including the structure of FIG. 5. FIG. 7 shows results for silicone oil as the fluid, with trace 140 indicating the performance of the inventive device including the structure of FIG. 3, while trace 130 indicates the performance of the comparative device including the structure of FIG. 5. FIG. 8 shows the results for water with trace 160 indicating the performance of the inventive device including the structure of FIG. 3, while trace 150 indicates the performance of the comparative device including the structure of FIG. 5. As may be seen from FIGS. 6-8, significant improvement was found for all three fluids, even with the height corresponding to height 33 of FIG. 2 being slightly greater in the inventive device than in the comparative device (see the Table below).

Figure 9:
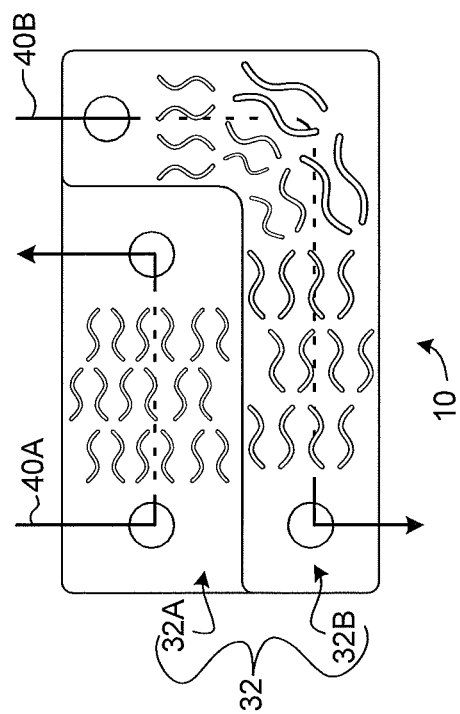
FIG. 9 is a plan view showing the layout of an alternative embodiment of a layer 32 of a device 10 like that of FIG. 1, but with the layer 32 divided into to sections 32A and 32B.

FIG. 9 is a plan view showing the layout of an alternative embodiment of a thermal control layer 32 in a device 10 according to the present invention. In devices of the type shown in FIG. 9, an individual layer 32 may is divided in to two or more sections, section 32A and section 32B in this case, with each section 32A, 32B having its own respective path 40A, 40B. Further, as in section 32A, the path 40A may lie in different directions in different portions of the layer 32. Separate sections 32A and 32B allow different temperatures to be maintained in difference parts of the thermal control layer 32 and hence in different parts of the device 10. Separate sections also allow the generation of different thermal profiles in different parts of the device 10, or thermal profiles lying in different directions, or both.

TABLE

|  | Inventive Device | Comparative Device |
| --- | --- | --- |
| Internal volume, ml | 8.2 (height = 630 μm) | 8.5 (610 μm) |
| Pressure drop, mbar (water, liter/min) | 118 | 100 |
| Heat transfer improvement (over comparative device for the listed fluid) |  |  |
| ethanol | 30% | NA |
| silicone oil | 40% | NA |
| water | 40% | NA |
| Pressure resistance, bar | 17.1 | 15.7 |

What is claimed is:

1. A multiple-layered microfluidic device comprising at least a first fluid path and at least a second fluid path, wherein the first fluid path comprises a layer or portion of a layer of the microfluidic device, the first path having multiple rows of serpentine wall segments positioned there along, said wall segments extending in a direction along the first path, said rows extending along a direction cross-ways to the first path, with adjacent ones of wall segments within a row arranged such that concave portions face concave portions of adjacent ones of segments, while convex portions face convex portions of adjacent ones of segments.

2. The device according to claim 1 wherein the segments are S-shaped.

3. The device according to either claim 1 wherein the segments of each row are at offset positions relative to the segments of an adjacent row.

4. The device according to claim 3 wherein the segments of each row are at offset positions relative to the segments of an adjacent row, the offset amount being one half of the distance within the row from one segment to the next segment.

5. The device according to claim 1 further comprising a first relatively more open region adjacent to a first row of the rows.

6. The device according to claim 1 comprising a second relatively more open region adjacent to a last row of the rows.

7. The device according to claim 1 wherein the height of the layer or portion of layer of the path is in the range of 0.2 to 1.5 millimeters.

8. The device according to claim 7 wherein the height of the layer or portion of layer of the path is in the range of 0.2 to 0.75 millimeters.

9. The device according to claim 1 wherein the thickness of the segments is in the range of 0.5 to 1.5 millimeters.

10. The device according to any of claim 1 wherein the distance between facing concave portions of adjacent ones of segments is at least twice the distance between facing convex portions adjacent ones of segments within the rows.

* * * * *